United States Patent
Han

(10) Patent No.: US 10,424,204 B1
(45) Date of Patent: Sep. 24, 2019

(54) COLLISION WARNINGS PROVIDED BY STATIONARY VEHICLES

(71) Applicant: Apple Inc., Cupertino, CA (US)

(72) Inventor: Byron B. Han, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/710,754

(22) Filed: Sep. 20, 2017

Related U.S. Application Data

(60) Provisional application No. 62/397,489, filed on Sep. 21, 2016.

(51) Int. Cl.
| | |
|---|---|
| G08G 1/16 | (2006.01) |
| G01S 13/93 | (2006.01) |
| G01S 17/02 | (2006.01) |
| G01S 17/89 | (2006.01) |
| G05D 1/02 | (2006.01) |

(52) U.S. Cl.
CPC ............ *G08G 1/164* (2013.01); *G01S 13/931* (2013.01); *G01S 17/02* (2013.01); *G01S 17/89* (2013.01); *G05D 1/02* (2013.01); *G05D 2201/0213* (2013.01)

(58) Field of Classification Search
CPC ....... G08G 1/164; G01S 17/02; G01S 13/931; G01S 17/89; G05D 1/02; G05D 2201/0213

USPC .......................................................... 701/301
See application file for complete search history.

(56) References Cited

U.S. PATENT DOCUMENTS

| | | | |
|---|---|---|---|
| 2002/0082777 A1* | 6/2002 | Halsted .................. | B60Q 9/008 701/301 |
| 2012/0286974 A1* | 11/2012 | Claussen ................ | G08G 1/162 340/935 |

* cited by examiner

*Primary Examiner* — Brian P Sweeney
(74) *Attorney, Agent, or Firm* — Robert C. Kowert; Meyertons, Hood, Kivlin, Kowert & Goetzel, P.C

(57) ABSTRACT

Automated collision warnings may be provided by stationary vehicles. Stationary vehicles may monitor the external environment of the vehicle for moving objects. If a possible collision with a moving object is detected, a collision avoidance action may be selected. The vehicle may be directed to perform the collision avoidance mechanism, which may include visual warnings, auditory warnings, vehicle-to-vehicle warning communications, or automated movement of the stationary vehicle to avoid the collision. A wakeup mechanism may be implemented to reduce power consumption of automated collision warnings by initiating monitoring for possible collision events automatically when a possible collision is likely.

20 Claims, 6 Drawing Sheets

COLLISION WARNINGS PROVIDED BY STATIONARY VEHICLES

This application claims benefit of priority to U.S. Provisional Application No. 62/397,489, filed Sep. 21, 2016, titled "Automated Collision Avoidance for Stationary Vehicles," which is hereby incorporated by reference in its entirety.

BACKGROUND

The rise of interest in automated control and navigation of vehicles has led to the inclusion of different types of remote sensing equipment installed on vehicles. These sensors can include one or more radars, ultrasonic sensors, light beam scanning devices, visible light camera devices, infrared camera devices, near-infrared camera devices, depth camera devices which can include one or more light-scanning devices, including LIDAR devices, etc. Automated navigation and control systems may process data collected by the sensors in order to detect and characterize objects in the environment. However, the collected sensor data may also be utilized to provide other services.

SUMMARY

Sensors implemented as part of a vehicle may collect sensor data for an environment. Processing of the sensor data may be performed to detect possible collision events when the vehicle is stationary, parked, or otherwise unattended. If a possible collision event is detected, then an action may be selected to avoid the possible collision, such as a visual or auditory warning, a warning message communicated to another vehicle, or automated movement of the vehicle. Sensor data collection and evaluation may be triggered by a wakeup event that is detected for automated collision avoidance.

Figure 1:
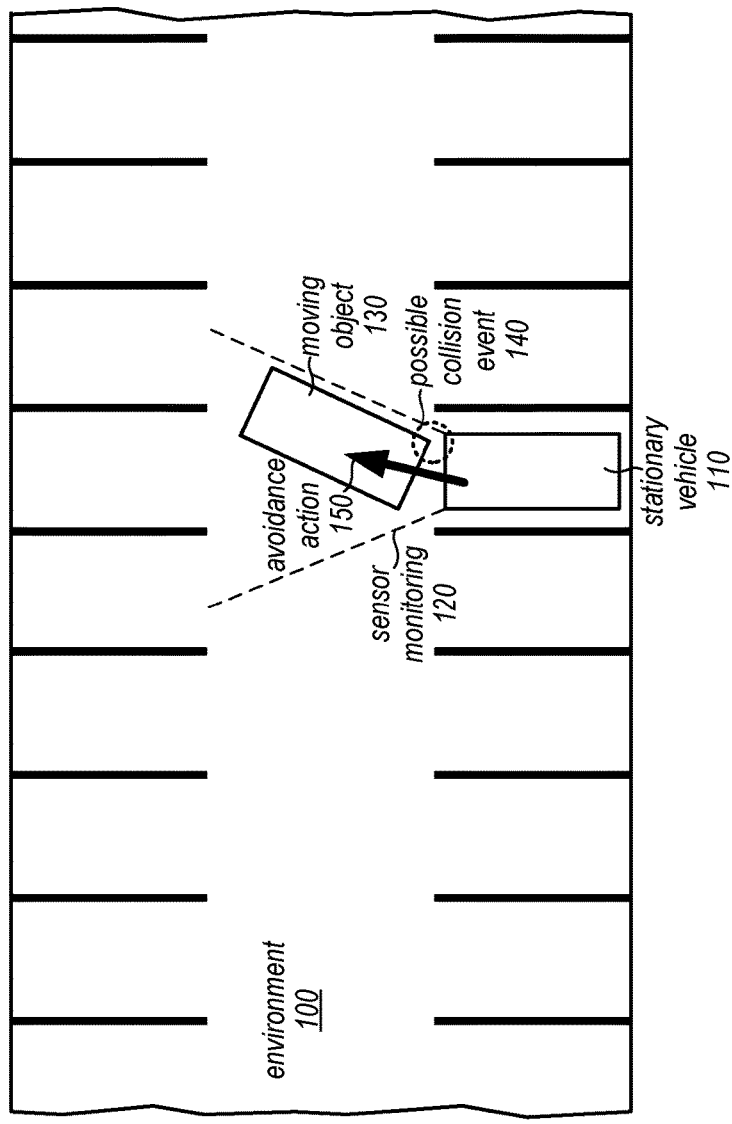
FIG. 1 illustrates a view of an environment that includes a vehicle implementing automated collision avoidance for a detected possible collision event, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

The systems and methods described here may implement automated collision avoidance for stationary vehicles. Increasing numbers of vehicles are equipped with an assortment of sensors that capture various kinds of environmental data in order to implement automated vehicle functions. Lane guidance and adaptive or automated cruise control, for instance, may be implemented to control the behavior of the vehicle based on sensor data that allows the vehicle to automatically adjust course to remain in a driving lane or to break or accelerate when operating in cruise control mode. Another area in which automation is increasingly common is that of collision avoidance for moving vehicles. Like lane guidance or automated cruise control, collision avoidance mechanisms rely upon sensor data to detect impending collisions between the moving vehicle and other objects in the environment, initiating warnings or automated braking of the vehicle. While such mechanisms can protect the moving vehicle, user error can override or disable the collision avoidance mechanisms on the moving vehicle. Moreover, many vehicles are not equipped with such collision avoidance mechanisms, increasing the chance that those vehicles may strike another object unintentionally.

Stationary vehicles in particular are prone to being struck by moving objects, such as other vehicles, as they are often unattended or unoccupied, and therefore unable to provide warning to objects that mays unintentionally be on a trajectory that collides with the stationary vehicle. Automated collision avoidance may be implemented for stationary vehicles so that avoidance actions can be automatically performed when a possible collision event may occur between the stationary vehicle and a moving object in the environment. In this way, objects, such as other vehicles that are not equipped collision avoidance mechanisms, or with faulty, disabled, or ignored collision avoidance mechanisms, may still be saved from collision with the stationary vehicle as a result of the avoidance action performed by the stationary vehicle. FIG. 1 illustrates a view of an environment that includes a vehicle implementing automated collision avoidance for a detected possible collision event, according to some embodiments.

Environment 100 may be an area within the detection range of one or more sensors monitoring the environment external to stationary vehicle 110. Stationary vehicle 110 may be any type of vehicle (e.g., car, van, truck, etc.). Stationary vehicle 110 may be a vehicle that is stopped, parked, unattended, or unoccupied by an operator or passenger. Stationary vehicle 110 may also be equipped with different sensors. For example, different types of sensors may be installed at stationary vehicle 110, such as radars, ultrasonic sensors, light beam scanning devices, visible light camera devices, infrared camera devices, near-infrared camera devices, depth camera devices which can include one or more light-scanning devices, including LiDAR devices. Stationary vehicle 110 may implement automated collision avoidance by performing monitoring 120 of sensor data captured by the sensors that observe the same or different portions of environment 100 to detect a possible collision event 140. In response to detecting a possible collision event 140 with a moving object 130, stationary vehicle 110 may select and perform a collision avoidance action 150.

Automated collision avoidance for stationary vehicles, such as stationary vehicle 110, may be enabled automatically. For example, a driver of stationary vehicle 110, may drive vehicle 110 to a parking spot, as depicted in FIG. 1. Vehicle 110 may detect when the driver is no longer in environment 100 and may enable automated collision avoidance. A key fob for vehicle 110, wearable device paired with vehicle 110, or mobile device paired with vehicle 110, for instance, may be detected as leaving environment 100 by one or more of the sensors installed at the vehicle. Automated collision avoidance may implement various power conservation techniques to ensure that monitoring and responsive actions performed do not drain stored energy beyond levels needed to restart the vehicle or perform other vehicle functions. In some embodiments, a wakeup mechanism may enable a transition from low powered monitoring to high powered monitoring. In this way, high powered monitoring may be reserved for scenarios where a possible collision event is likely to be detected.

Automated collision avoidance may detect a possible collision event in different ways. Distance measures, for instance, may be determined between objects in environment 100 and stationary vehicle 110 and compared with a threshold. If a moving object crosses the threshold as determined by the distance measures, then a possible collision event may be detected. In some embodiments, other sensor data may be captured to determine possible trajectories for moving objects, including confidence or risk values indicating the likelihood that the object will be on a trajectory that ends in a collision with stationary vehicle 110. Object filtering may be implemented, in some embodiments, which filters out tracking or monitoring of objects in environment 100 under a certain type, size or speed.

Automated collision avoidance may implement a variety of different avoidance actions 150. For example, stationary vehicle 110 may be equipped with vehicle lights for common vehicle operations (e.g., brake lights, turn signals, emergency lights, cabin lights, etc.) which may be turned on or flashed to provide a visual warning signal. In some embodiments, stationary vehicle 110 may be equipped with external display devices (e.g., liquid crystal display (LCD)), which may display signals, lights, text, or other visual warning indications. Avoidance action 150 may be an auditory warning, a sound or alert performed by a horn or external speaker installed at stationary vehicle 110. In some embodiments, avoidance action 150 may be an automated movement of vehicle 110 (e.g., by requesting that an automated navigation system move vehicle 110, as discussed below with regard to FIG. 3). One or more of these different avoidance actions may be determined based on the possible collision event detected (e.g., moving object classification, trajectory, speed, environmental conditions, etc.).

Note that the illustration discussed above with FIG. 1 is merely provided as an example of a stationary vehicle, moving object, environment, possible collision event, and avoidance action. For example, a possible collision event may be detected by stationary vehicle 110 for a pedestrian within environment 100 and moving object 130. Therefore, the previous discussion of the examples illustrated in FIG. 1 is not intended to be limiting.

Next, the specification describes a control system implemented in a vehicle that may provide automated collision avoidance for when the vehicle is stationary. Various examples of components or configurations of the control system that implement automated collision avoidance may then be discussed. Flow charts describing various methods and techniques to implement automated collision avoidance for stationary vehicles are then described. Finally, a description of an example computing system upon which the various components, modules, systems, devices, and/or nodes may be implemented is provided. Various examples are provided throughout the specification.

Figure 2:
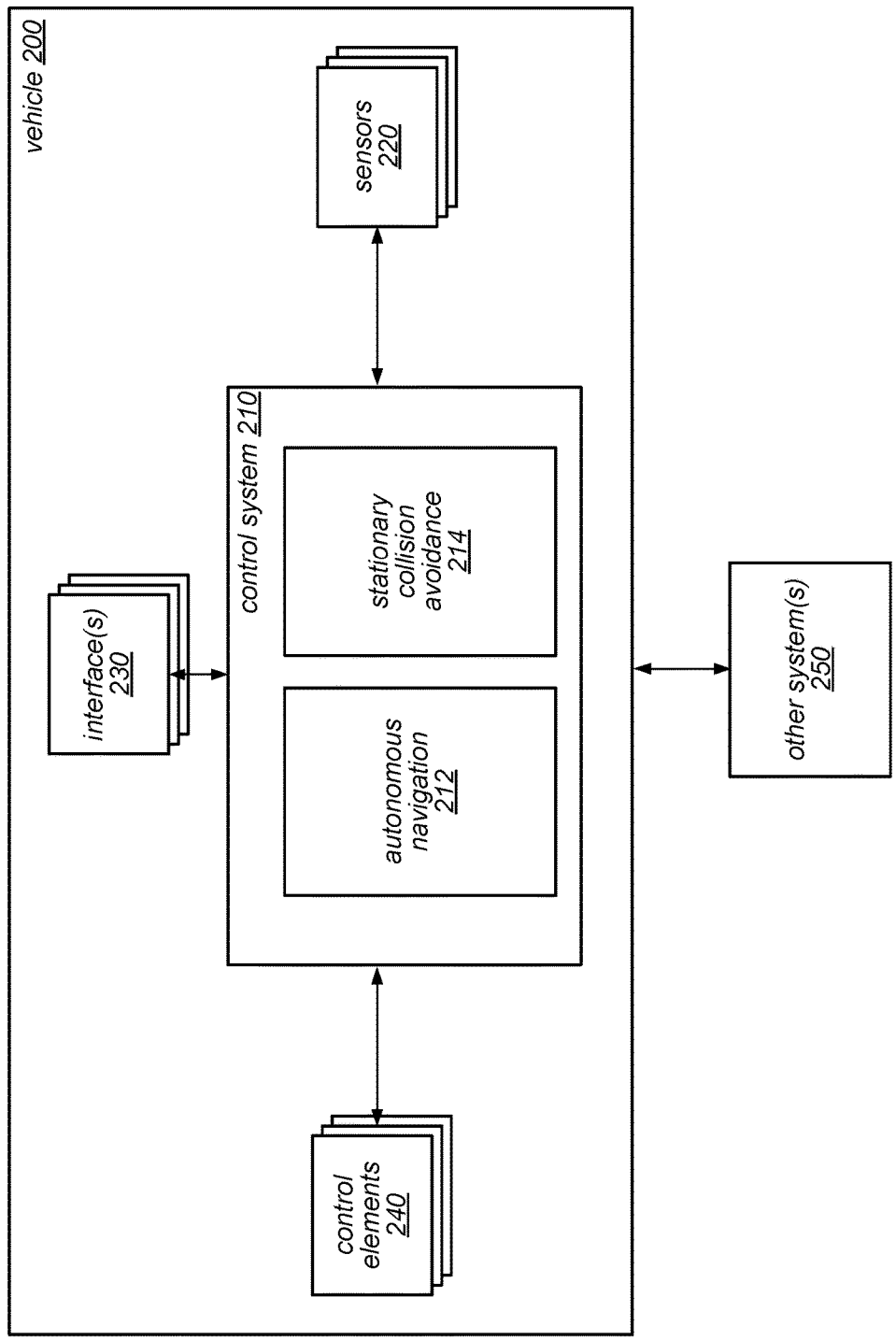
FIG. 2 illustrates a logical block diagram of a vehicle which implements an automated collision avoidance system that processes sensor data collected by the vehicle for possible collision events, according to some embodiments.

FIG. 2 illustrates a logical block diagram of a vehicle which implements an automated collision avoidance system that processes sensor data collected by the vehicle for possible collision events, according to some embodiments. Vehicle 200 may implement control system 210 to provide various automated functions such as autonomous navigation 212 and stationary collision avoidance 214. Autonomous navigation 212 may be implemented in a vehicle 200 which can be "unmanned" or accommodate one or more occupants, including one or more of a land vehicle (e.g., an automobile, truck, or van) aircraft, or watercraft. Autonomous navigation 212 can enable autonomous navigation of the vehicle along one or more various routes through one or more various environments, where autonomous navigation 212 determines and selects the routes along which the autonomous navigation 212 navigates vehicle 200. Autonomous navigation 212 controls various control elements 240 of a vehicle to autonomously direct (e.g., drive) the vehicle (herein referred to as "autonomously navigate", "autonomous navigation", etc.) along one or more portions of a route.

Autonomous navigation 212 may develop, select, and change driving routes based on perception decisions determined by processing sensor data from sensors 220, which may include external sensors and internal sensors. External sensors may be sensors that can monitor one or more aspects of an external environment relative to vehicle 200. Such sensors can include camera devices, video recording devices, infrared sensor devices, radar devices, light-scanning devices including LiDAR devices, precipitation sensor devices, ambient wind sensor devices, ambient temperature sensor devices, one or more global navigation satellite system devices (e.g., GPS/DGPS, BeiDou, DORIS, Galileo, GLONASS, etc.) or some combination thereof, or the like. Internal sensors may monitor the state of vehicle, including inertial measurement sensors, like an accelerometer, odometer, and angular rate sensors (e.g., gyroscopes), some combination thereof, or the like. Generally, external sensors and internal sensors can capture or generate sensor data for vehicle 200 to navigate through the environment, providing captured sensor data to autonomous navigation. Additional external sensors and internal sensors can capture or generate sensor data for vehicle 200 to provide collision avoidance with the vehicle is stationary, as discussed below with regard to FIG. 3.

Autonomous navigation 212 may direct control actions to controllers or control elements 240 in order to navigate vehicle 200 along a route or in accordance with a collision avoidance movement requested by stationary collision avoidance 214. Control elements 240 may include, but are not limited to steering control elements, throttle control elements, braking control elements, transmission control elements, lighting elements, display elements, speaker elements, or horn elements, each of which may be operated independently of control element input commands from a user of vehicle 200. Autonomous navigation 212 can include active control of control elements 240 while enabling manual override of control of elements 240 via manual input from a user via user interaction with one or more user interfaces 230 included in the vehicle. For example, autonomous navigation 212 can autonomously navigate vehicle 200 in the absence of input commands from a vehicle user via one or more user interfaces 230 of vehicle 200, and autonomous navigation 212 can cease control of one or more elements 240 in response to a user-initiated input command to the one or more elements 240 from one or more user interfaces 230 of vehicle 200.

As noted above, vehicle 200 can include one or more sets of interfaces 230. One or more interfaces 230 can include one or more user interface devices, also referred to as user interfaces, with which a user of vehicle 200 can interact to interact with one or more portions of autonomous navigation 212, control elements 240, stationary collision avoidance 214, etc. For example, an interface 230 can include a display interface with which a user can interact to command the enablement or disablement of stationary collision avoidance 212.

In some embodiments, one or more interfaces 230 includes one or more communication interfaces which can communicatively couple autonomous navigation 212 with one or more remote services, systems, etc. via one or more communication networks (not illustrated). For example, an interface 230 can include a wireless communication transceiver which can communicatively couple autonomous navigation 212 with one or more remote services via one or more wireless communication networks, including a cloud service. In some embodiments, data can be received from one or more externally-located systems via a system other than a communication network. For example, a vehicle can transmit data to another vehicle via flashing one or more lights on the vehicle, and the other vehicle can receive and process such data via a camera device which captures and processes the light flashes. Autonomous navigation 212 can communicate virtual route characterizations, various sets of input data, etc. to a remote service, system, etc. via one or more interfaces 230, receive virtual characterizations of one or more roadway portions, etc. from the one or more remote services, systems, etc., and the like. Similarly, collision avoidance action selection can communicatively couple stationary collision avoidance with other vehicles to provide collision avoidance warnings directly to another vehicle (e.g., via an ad-hoc network between the vehicle and the other vehicle).

Figure 3:
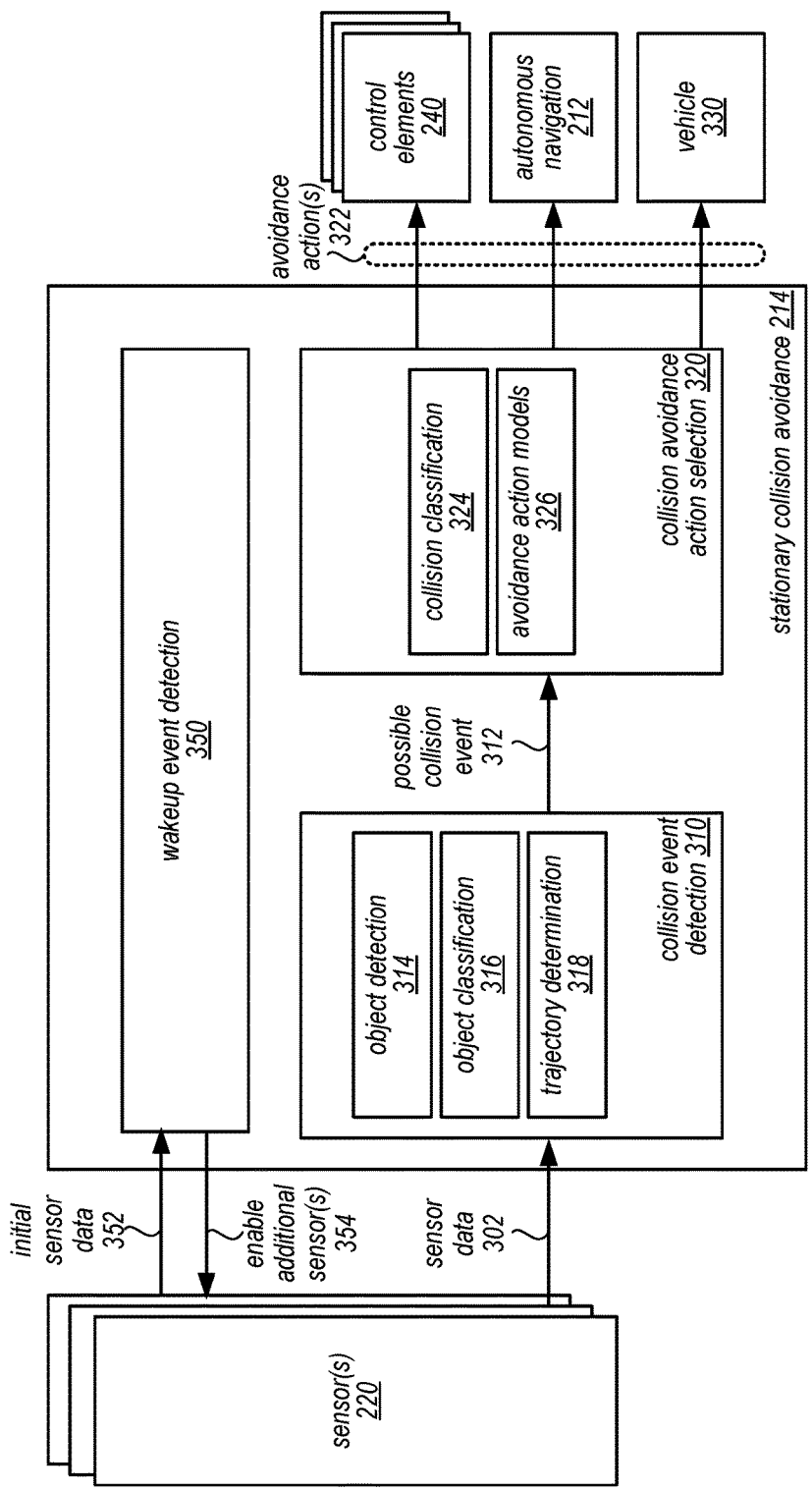
FIG. 3 illustrates an example automated collision avoidance system, according to some embodiments.

Control system 210 may also implement stationary collision monitoring 214 in order to provide automated collision avoidance in various embodiments. FIG. 3 illustrates an example automated collision avoidance system, according to some embodiments. Because stationary collision avoidance 214 may operate when a vehicle is stationary and may not be generating or drawing power from an external source, stationary collision avoidance 214 may monitor stored energy levels for vehicle 200 (e.g., battery levels) in order to determine which kinds of sensor data to collect and evaluate, as well as what types of collision avoidance warnings to provide (or to not provide). For example, in some embodiments, stationary collision avoidance 214 may determine blocked or protected areas in the environment external to the vehicle in order to shut down or limit sensor data collection and/or processing for portions of the vehicle that are not vulnerable to a collision. If, for instance, a vehicle were parked at the end or a row of parking spots that was open to traffic running parallel with the parking spots, then, sensor data may be captured for rear, forward, and the open side of the vehicle in order to monitor for possible collision events.

In some embodiments, stationary collision avoidance may implement wakeup event detection 350 which may initiate active collision avoidance monitoring by stationary collision avoidance system 214. Wakeup event detection 350 may monitor a subset of sensor data, such as initial sensor data 352, which may be captured by passive or low power sensors (e.g., image sensors, low power radar, etc.). If the initial sensor data 352 is evaluated and indicates multiple moving objects, a large number of moving objects, or a fast moving object, for example, wakeup event detection 350 may trigger a wakeup event to enable additional sensors 354 to collect more sensor data for evaluation for possible collision events.

Stationary collision avoidance may implement collision event detection 310 to monitor, analyze, and/or evaluate sensor data 302 captured by sensor(s) 220 to determine whether a possible collision event may occur. For example, as discussed below with regard to FIG. 5, object detection 314, object classification 316, and trajectory determination 318 may be implemented as part of collision event detection 310 to detect moving objects within the external environment (e.g., by performing feature extraction on sensor data), classify the objects (e.g., vehicles, pedestrians, animals, etc.), and evaluate whether possible trajectories determined for the moving objects indicate a collision with vehicle 200. Note that various other components or techniques other than those illustrated in FIG. 3 may also be implemented, including techniques that determine whether moving object has enter a boundary or distance threshold surrounding the vehicle (which may be dynamically determined based on the velocity of the moving object).

A possible collision event 312 may be provided to collision avoidance action selection 320, in various embodiments. Collision avoidance action selection 320 may determine one or more avoidance actions to perform in response to the collision event. In at least some embodiments, collision avoidance selection may implement collision classification 324 to determine the type or classification of possible collision (e.g., vehicle collision, pedestrian collision, collision between objects in the environment, etc.). Based on the determined type or classification, collision avoidance action selection 320 may evaluate a corresponding avoidance action response model 326. For example, if the detected collision is with a vehicle backing up into the stationary vehicle, then a rear vehicle collision model may be accessed to determine whether to select a visual, auditory, movement, or communication avoidance action (as well as a specific type of visual, auditory, movement, or communication avoidance action).

Once the avoidance action is selected, collision avoidance action selection may direct the performance of the avoidance action(s) 322 by the vehicle. As illustrated in FIG. 3, avoidance actions may be directed by accessing control elements 240. For example, a visual avoidance action, flashing or turning on certain lights, displays, or displaying various text or symbols on vehicle 200 may be controlled by control elements 240. Similarly, an auditory avoidance action, honking a horn, performing a warning sound, or projecting human speech warnings may be controlled by control elements 240. For vehicle movements, collision avoidance action selection 320 may direct autonomous navigation 212 to drive the vehicle according to a determined movement away from the possible collision (e.g., pull forward into a vacant parking space). In at least some embodiments, stationary collision avoidance may send a warning message via a wireless communication to a vehicle 330 that is the potentially colliding object which may trigger a collision avoidance mechanism at 330 or display/project a warning to a driver of vehicle 330.

Please note that the illustrated components discussed above with regard to FIG. 3 are meant to provide an example of the various kinds of collision event detection techniques and avoidance actions that may be performed and are not intended to be limiting as to other configurations or implementations of automated stationary collision avoidance.

As stationary vehicles may capture and evaluate sensor data to provide collision avoidance, additional uses of the capture sensor data may be useful. For instance, when stationary vehicles are parked in environments that offer parking for multiple vehicles, available parking spaces may be reported to a system or service that offers crowd-sourced parking information to vehicles attempting find a parking spot. For example, in areas where large parking lots include many isolated parking spots (e.g., sports stadiums or airports), the ability to be provided with the location of available parking spaces may ensure that parking areas are optimally utilized. When vehicles operating under automated navigation are attempting to locate a parking spot, the ability to retrieve available parking locations from a service may provide a better passenger experience than directing the vehicle to search in the parking area.

Figure 4A:
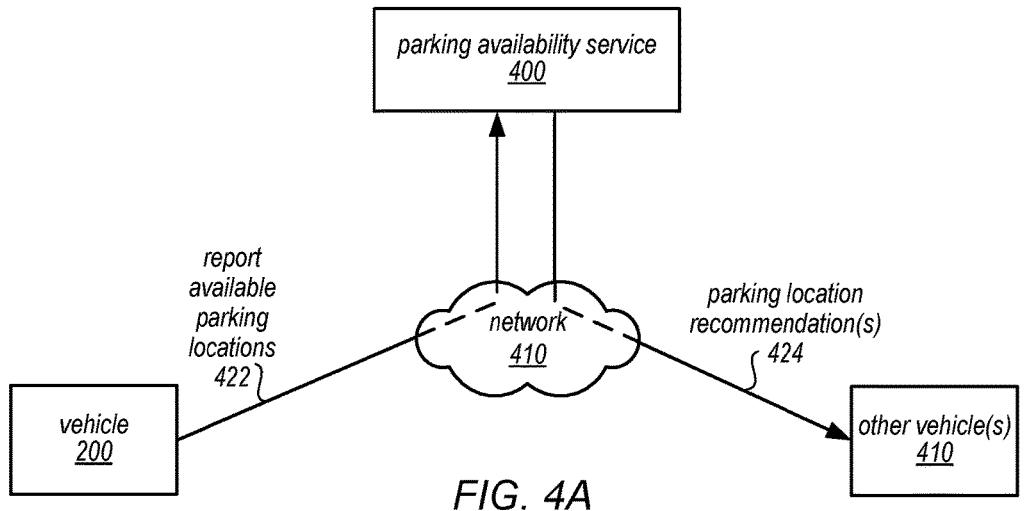
FIGS. 4A and 4B illustrate interactions to report available parking locations detected by a stationary vehicle, according to some embodiments.
Figure 4B:
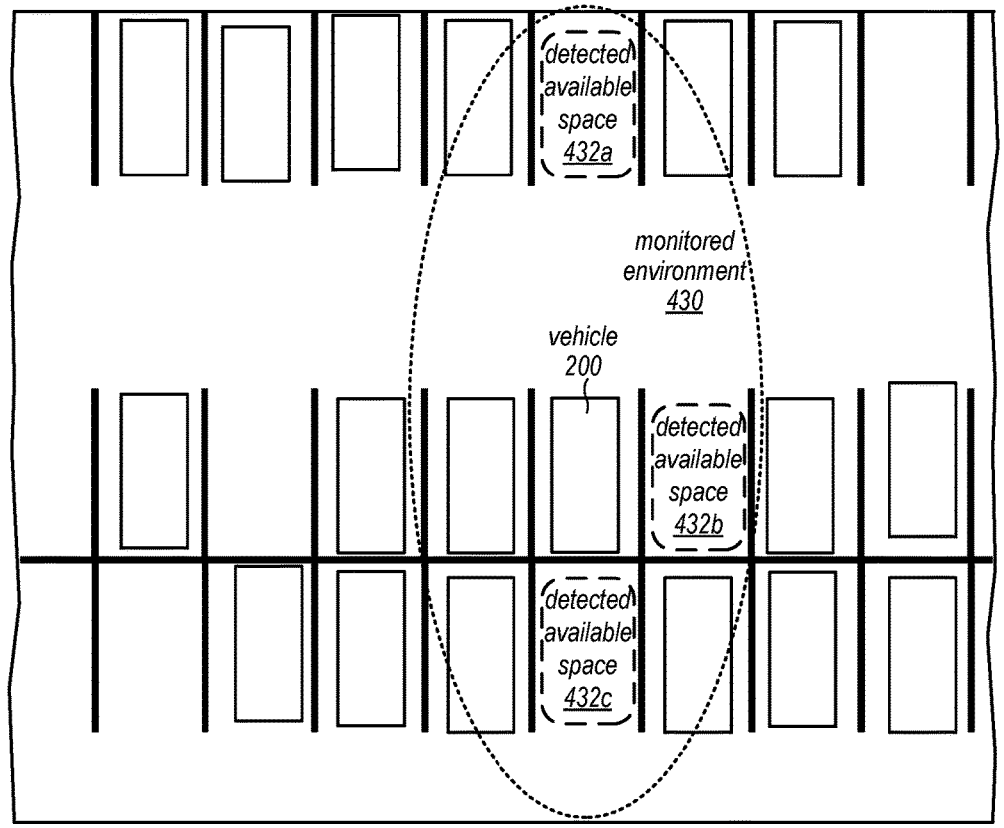

FIG. 4A illustrates a logical diagram of a vehicle reporting available parking locations to a parking availability service. Vehicle 200 may evaluate sensor data collected to provide collision avoidance for the vehicle to determine whether an available parking location or space is within the monitored environment of vehicle 200. In FIG. 4B, for instance, vehicle 200 is illustrated as monitoring environment 430. Based on the collected sensor data, vehicle 200 may identify available spaces, 432a, 432b, and 432c within environment 430. Other available spaces not within environment 430 may not be detected. Vehicle 200 may be able to determine location information for the available spaces 432, based on location information for vehicle 200 (e.g., GPS coordinates) and location information that may be calculated based on the sensor data (e.g., distance measurements between the vehicle and objects beyond available spaces 432).

Vehicle 200 may be configured to report available parking locations 422 for a geographic area (e.g., identifiable by a location identifier or coordinates) via network 410 to parking availability service 400. For instance, vehicle 200 may be able to wireless connect to a wide area network, such as the internet, and generate and send reporting messages according to a programmatic interface for parking availability service 400. Parking availability service 400 may be a network-based service implemented on one or multiple computing systems, such as computing system 600 in FIG. 6, in order to maintain a listing of available parking locations or spaces within respective geographic areas. For example, parking availability service 400 may implement one or more network servers to act as a front-end for service 400, interpreting and dispatching requests, such as reporting requests 422 or requests and recommendations for parking locations 424 to backend resources in parking availability service 400. Parking availability service 400 may implement one or more storage resources to maintain the lists for available parking locations in different geographic areas and may implement a reservation or recommendation coordinator to provide parking location recommendations 424 so that different recommendations are provided to vehicles requesting recommendations for the same geographic area. Other vehicle(s) 410 may utilize parking availability service 400 to obtain parking location recommendations 424 for a geographic area by submitting a recommendation request (not illustrated) to parking availability service 400.

Please note that users can selectively block use of, or access to, personal data, such as location data, including detected available spaces in the monitored environment of the stationary vehicle. A system incorporating some or all of the technologies described herein can include hardware and/or software that prevents or blocks access to such personal data. For example, the system can allow users to "opt in" or "opt out" of participation in the collection of personal data or portions of portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses, and not share or sell the data outside of those legitimate uses. Such collection should occur only after receiving the users' informed consent. Furthermore, third parties can evaluate these entities to certify their adherence to established privacy policies and practices.

Figure 5:
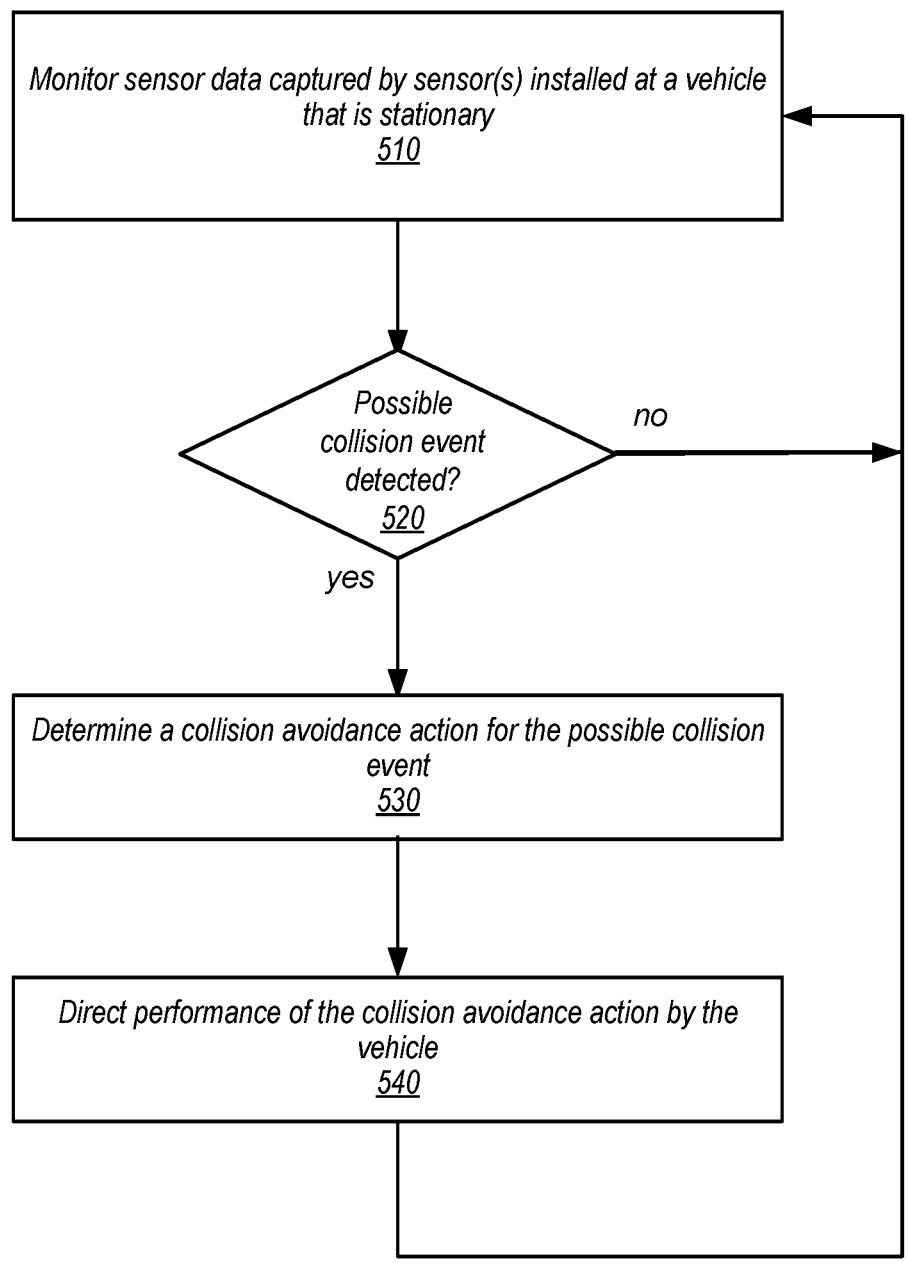
FIG. 5 is a high-level flowchart illustrating various methods and techniques to implement automated collision avoidance for stationary vehicles, according to some embodiments.

FIGS. 2-4B provide examples of a control system in a vehicle that implements automated collision avoidance for a stationary vehicle. However, numerous other types or configurations of control systems (including other types and configurations of autonomous navigation systems) may implement sensors that collect data which may be monitored to implement automated collision avoidance for a stationary vehicle. FIG. 5 is a high-level flowchart illustrating various methods and techniques to implement automated collision avoidance for stationary vehicles, according to some embodiments. The various components described above may implement these techniques as well as various other systems.

Automated collision avoidance for stationary vehicles may be manually enabled or disabled for a vehicle. For example, a vehicle control interface, such as one of interfaces 230 in FIG. 2 above, may receive a request to enable or disable automated collision avoidance at the vehicle. For example, if the vehicle is to be parked for a long period of time or in a closed location (e.g., a garage) that protects the vehicle, a user may request that automated collision avoidance be disabled in order to conserve power for the vehicle. Automated collision avoidance may be automatically enabled or disabled, in various embodiments. For example, a geo-fence or other location association mechanism may be implemented to describe a vehicle at a "home" location that is protected from collisions. When parked within the geo-fence, the automated collision avoidance system may be disabled. However, upon leaving the geo-fence (or when parked in a location that is not "home"), the automated collision avoidance system may be enabled. Automated collision avoidance may be automatically disabled or enabled based on stored energy reserves at the vehicle. If, for instance, a battery level falls below a monitoring threshold, then automated collision avoidance may be disabled until the stored energy level rises above the monitoring threshold (triggering enablement of automated collision avoidance). In some embodiments, automated collision avoidance may be enabled or disable based on the presence of a vehicle operator or passenger with the monitored environment. In this way, energy to provide automated collision avoidance may not be expended until the vehicle is unattended with no one to provide a collision avoidance warning.

In some embodiments, protected or blocked areas in the environment around a stationary vehicle may be determined. Sensors observing the protected or blocked areas may be disabled or ignored for the purposes of detecting a possible collision event, as a collision may not be possible at the protected or blocked area. In this way, power consumption may be reduced so that monitoring is only performed at vulnerable locations on the stationary vehicle.

In at least some embodiments, monitoring for a wakeup event may be performed prior to monitoring for a possible collision event, as discussed above with regard to FIG. 3. For example, a subset of sensors (e.g., low powered radar or vibration sensors) may continuously monitor for a wakeup event (e.g., which may be indicated by detecting the presence of moving objects). Once the wakeup event is detected, then monitoring of sensor data captured by a larger set of sensors may be performed, in some embodiments, as indicated at 510. However, in other embodiments, monitoring for possible collision events may always occur while automated collision avoidance is enabled.

Sensor data may be captured by various sensor(s) installed at a stationary vehicle. The sensor(s) may be configured to monitor the external environment of a vehicle, in various embodiments. For instance the various types of sensors described above with regard to FIGS. 1 and 2, such as radars, ultrasonic sensors, light beam scanning devices, visible light camera devices, infrared camera devices, near-infrared camera devices, depth camera device that can observe one or more portions of the environment external to the vehicle. As indicated at 510, the sensor data may be monitored for a possible collision event. A possible collision event may be detected by tracking the movement or trajectory of object(s) within the environment. For example, machine learning or other statistical analysis models may be implemented to process the received sensor data to extract features indicative of objects in the environment. When processing image data, for instance, edges, curves, patterns, shapes, or other visual features may be identified based on captured image data. For sensors that provide distance measures, such as LiDAR or radar, collections of distance measures may be associated together into clusters to identify objects based on the clustering of distance measures. The extracted features may then be evaluated to determine a type or classification of moving objects, such as a vehicle or pedestrian. Tracking techniques may be employed to track the movement of the classified objects. Based on the determined movements of the objects, possible trajectories may be determined. The possible trajectories may then be evaluated to determine if the trajectories collide with the stationary vehicle. If a possible trajectory with a high confidence value is determined to collide with the stationary vehicle, then a possible collision event for the moving object may be triggered.

Possible trajectory determination is one of many different techniques that may be implemented to detect possible collision events. In some embodiments, possible collision events may be detected by implementing a dynamically determined boundary, threshold, or other limitation based on the distance and velocity between moving objects and the stationary vehicle. For example, at two feet boundary may be determined based on the speed of a moving object for the stationary vehicle so that if the moving object moves closer than two feet to the stationary vehicle, a possible collision event may be detected. Multiple conditions or criteria may be implemented to trigger a possible collision event. For example, in addition to a moving object being within a boundary around the stationary vehicle, the moving object may also have to be larger than a minimum size. Consider a scenario where birds or small animals approached the stationary vehicle. Without a size evaluation, such birds or small animals might trigger collision avoidance actions (though such collisions are unlikely). Instead, if the moving object were detected be larger (e.g., the dimensions of a human or vehicle), then a possible collision event may be triggered.

Criteria, conditions, or techniques to detect possible collision events may also be dependent on the sensor data available (which may also be dependent on the environment). For example, some sensor data may be available or preferable in certain conditions (e.g., image data in daytime, infrared in nighttime, etc.). Because different detection techniques for possible collision events may rely upon different sensor data, the detection technique applied may differ based on the provided sensor data. If for instance, the environment has low light or visibility, image data may be collected and discarded (or not collected at all), as the image data may be unusable for detection in such conditions. Instead, radar, sonar, or LiDAR may be utilized for collision detection and thus detection techniques optimized to radar, sonar, or LiDAR may be performed to determine whether a possible collision event occurs.

Possible collision events may include collisions between the moving object and another object in the environment that is observable by the stationary vehicle. For example, a pedestrian may be walking alongside the stationary vehicle and another moving object, a vehicle, may be moving along a trajectory that intersects with the pedestrian (along a different side of the vehicle). A possible collision event may be triggered based on the combined possible trajectories of the pedestrian and the other vehicle (e.g., triggering a collision avoidance action that may direct the vehicles attention to the pedestrian, which may not be visible on the other side of the vehicle).

As indicated by the negative exit from 520, monitoring may continue until a possible collision event is detected. If a possible collision event is detected, then as indicated by the positive exit from 520, a collision avoidance action for the possible collision event may be determined, as indicated at 530, in some embodiments. A knowledge base, machine learning model, or other decision engine may be implemented to select one or more collision avoidance actions that provide for an optimal probability of avoiding the possible collision. For example, for slow moving objects triggering a possible collision event, a visual display of solid or flashing lights on the vehicle may be sufficient to provide a collision warning to the moving object. However, visual warnings may be less optimal in certain conditions (e.g., well-lit environments, such as daytime environments), so an auditory warning or vehicle communication may be sent. In at least some embodiments, collision avoidance actions may include human readable textual or symbolic displays or human speech auditory warnings.

As indicated at 540, performance of the collision avoidance action by the vehicle may be directed, in some embodiments. For example, various interfaces, communication networks, or other control elements (as discussed above with regard to FIG. 3) may be utilized to control the vehicle. In the case of vehicle movement as the collision avoidance action, a request may be provided to an automated navigation system in order to perform the vehicle movement.

Figure 6:
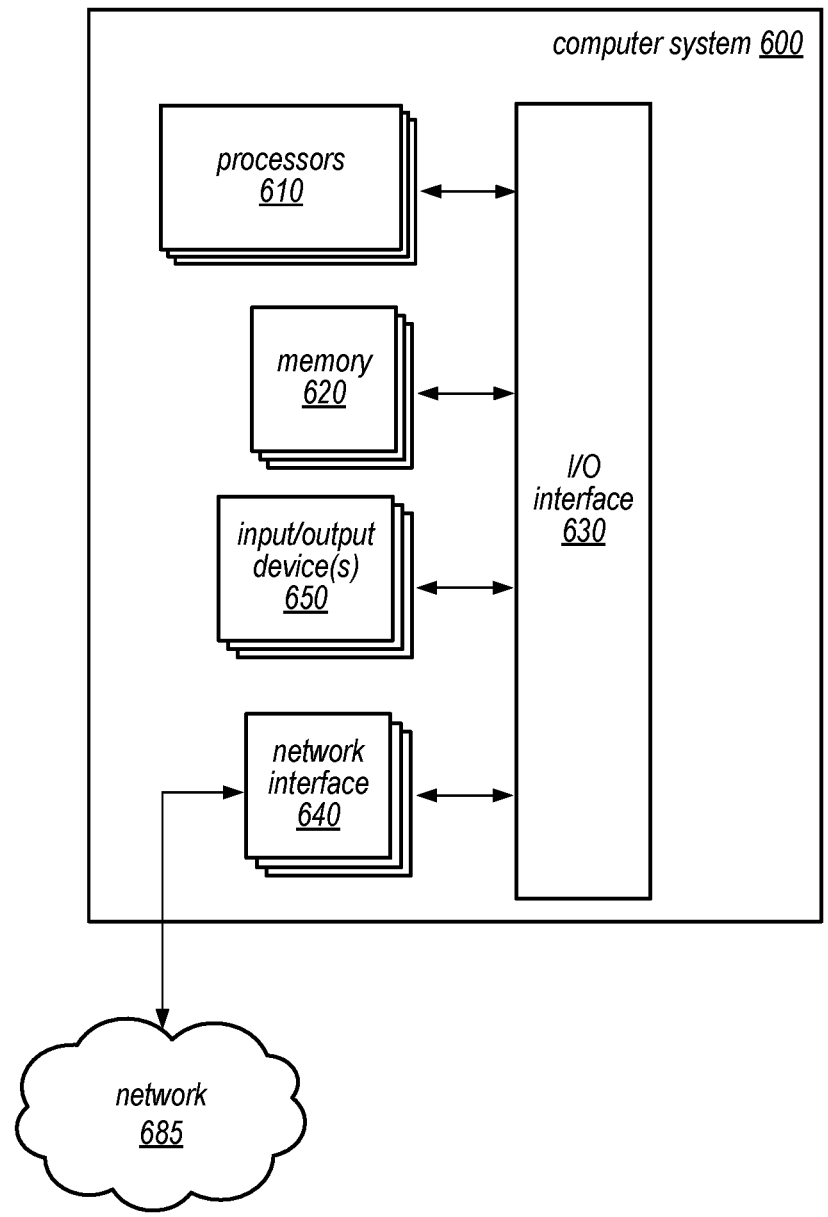
FIG. 6 illustrates a computer system that may be configured to include or execute any or all of the embodiments described herein.

FIG. 6 illustrates an example computer system 600 that may be configured to include or execute any or all of the embodiments described above. In different embodiments, computer system 600 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of automated collision avoidance for stationary vehicles may be executed in one or more computer systems 600, which may interact with various other devices. Note that any component, action, or functionality described above with respect to FIGS. 1 through 5 may be implemented on one or more computers configured as computer system 600 of FIG. 6, according to various embodiments. In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices, which can include one or more user interface (also referred to as "input interface") devices. In some cases, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 620 may be configured to store program instructions, data, etc. accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions included in memory 620 may be configured to implement some or all of an automated image capture system, incorporating any of the functionality described above. Additionally, existing control data of memory 620 may include any of the information or data structures described above. In some embodiments, program instructions and/or data may be received, sent or stored upon different types of computer-accessible media or on similar media separate from system memory 620 or computer system 600. While computer system 600 is described as implementing the functionality of functional blocks of previous Figures, any of the functionality described herein may be implemented via such a computer system.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network 685 (e.g., carrier or agent devices) or between nodes of computer system 600. Network 685 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices may, in some embodiments, include one or more display terminals, keyboards, keypads, touchpads, scanning devices, voice or optical recognition devices, or any other devices suitable for entering or accessing data by one or more computer systems 600. Multiple input/output devices may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

Memory 620 may include program instructions, which may be processor-executable to implement any element or action described above. In one embodiment, the program instructions may implement the methods described above. In other embodiments, different elements and data may be included. Note that data may include any data or information described above.

Those skilled in the art will appreciate that computer system 600 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. An apparatus, comprising:
    one or more sensors, installed in a vehicle, that monitor an external environment of the vehicle;
    a stationary collision avoidance system, installed in a vehicle, the stationary collision avoidance system configured to:
        receive sensor data captured by the one or more sensors;
        process the received sensor data to:
            detect a possible collision event with a moving object in the external environment; and
            determine, from among multiple object classifications that each indicate a respective type of object, an object classification for the moving object; and
        upon detection of the possible collision event:
            determine, based at least in part on the object classification, a collision avoidance action to perform by the vehicle; and
            direct performance of the avoidance action by the vehicle.

2. The apparatus of claim 1,
wherein the apparatus further comprises one or more control elements, configured to operate lighting functions of the vehicle;
wherein the determined collision avoidance action is a visual warning; and
wherein to direct performance of the avoidance action, the stationary collision avoidance system is configured to direct the one or more control elements to operate the lighting functions to perform the visual warning.

3. The apparatus of claim 1,
wherein the apparatus further comprises an interface, configured to wirelessly communicate with other vehicles;
wherein the moving object is another vehicle;
wherein the determined collision avoidance action is a collision warning indication; and
wherein to direct performance of the avoidance action, the stationary collision avoidance system is configured to send the collision warning indication to the other vehicle via the interface.

4. The apparatus of claim 1,
wherein the apparatus further comprises one or more controllers, configured to operate driving functions of the vehicle;
wherein the determined collision avoidance action is a vehicle movement; and
wherein to direct performance of the avoidance action, the stationary collision avoidance system is configured to direct the one or more controllers to drive the vehicle according to the determined vehicle movement.

5. The apparatus of claim 1, wherein the apparatus further comprises one or more other sensors that observe the external environment in addition to the one or more sensors, and wherein the stationary collision avoidance system is further configured to:
determine one or more protected locations in the external environment of the vehicle, wherein the one or more additional sensors observe the protected locations of the external environment; and
disable sensor data capture for the one or more additional sensors.

6. The apparatus of claim 1, wherein the stationary collision avoidance system is further configured to:
receive initial sensor data from at least one of the one or more sensors;
process the initial sensor data to detect a wakeup event for the stationary collision avoidance system;
upon detection of the wakeup event:
enable sensor data capture at other ones of the one or more sensors that did not send the initial sensor data; and
perform the processing of the sensor data to detect the possible collision event, wherein the received sensor data is received from sensors enabled in response to the detection of the wakeup event.

7. The apparatus of claim 1, wherein the stationary collision avoidance system is further configured to:
receive a request to disable automated stationary collision avoidance for the vehicle; and
disable processing of subsequent sensor data for possible collision events in response to the request to disable the automated stationary collision avoidance for the vehicle.

8. A method, comprising:
performing, by one or more computing devices:
monitoring sensor data captured by one or more sensors installed a vehicle that observe an environment external to the vehicle, wherein the vehicle is stationary;
based, at least in part, on the monitoring:
detecting a possible collision event with a moving object in the environment; and
determining, from among multiple object classifications that each indicate a respective type of object, an object classification for the moving object; and
in response to detecting the possible collision event:
determining, based at least in part on the object classification, a collision avoidance action to perform by the vehicle; and
directing performance of the avoidance action by the vehicle.

9. The method of claim 8, wherein the determined collision avoidance action is an auditory warning, and wherein directing performance of the avoidance action by the vehicle comprises directing at least one of one or more speakers installed at the vehicle or one or more horns installed at the vehicle to perform the auditory warning.

10. The method of claim 8, wherein the moving object is another vehicle,
wherein the determined collision avoidance action is a collision warning indication, and
wherein directing performance of the avoidance action by the vehicle comprises:
sending the collision warning indication to the other vehicle via a wireless communication interface from the vehicle to the other vehicle.

11. The method of claim 8, wherein detecting the possible collision event with a moving object in the environment comprises identifying a pedestrian in the environment external to the vehicle at risk of collision with the moving object.

12. The method of claim 8, further comprising:
receiving initial sensor data from at least one of the one or more sensors;
evaluating the initial sensor data to detect at wakeup event for the stationary collision avoidance system;
upon detecting the wakeup event:
enabling sensor data capture at other ones of the one or more sensors that did not send the initial sensor data; and
initiating the monitoring of the sensor data to detect the possible collision event, wherein the received sensor data is received from sensors enabled in response to the detection of the wakeup event.

13. The method of claim 8, further comprising:
evaluating the sensor data to identify one or more available parking locations in the environment; and
sending an indication of the one or more available parking locations to a remote system.

14. The method of claim 13, wherein the remote system is a network-based service, and where in the method further comprises:
performing, by one or more other computing devices implementing the network-based service:
maintaining a listing of available parking locations in an area that includes the environment;
receiving the indication of the one or more available parking locations from the vehicle;
updating the listing of available parking locations according to the request; and
in response to a request from another vehicle for available parking locations in the area, sending one or more available parking locations identified in the listing to the other vehicle.

15. A non-transitory, computer readable storage medium, storing program instructions that when executed by one or more computing devices cause the one or more computing devices to implement:
- receiving sensor data captured by one or more sensors installed a vehicle that observe an environment external to the vehicle, wherein the vehicle is stationary;
- evaluating the sensor data to:
  - detect a possible collision event with a moving object in the environment; and
  - determine, from among multiple object classifications that each indicate a respective type of object, an object classification for the moving object; and
- upon detecting the possible collision event according to the evaluation:
  - selecting, based at least in part on the object classification, a collision avoidance action to perform by the vehicle; and
  - directing performance of the avoidance action by the vehicle.

16. The non-transitory, computer readable storage medium of claim 15,
- wherein at least one or more lighting or display elements are installed at the vehicle;
- wherein the collision avoidance action is a visual warning; and
- wherein, in directing performance of the avoidance action, the programming instructions cause the one or more computing devices to implement operating the at least one or more lighting or display elements to perform the visual warning.

17. The non-transitory, computer readable storage medium of claim 15,
- wherein an automated navigation system is installed at the vehicle;
- wherein the collision avoidance action is a vehicle movement; and
- wherein to direct performance of the avoidance action, the stationary collision avoidance system is configured to direct the automated navigation system to drive the vehicle according to the vehicle movement.

18. The non-transitory, computer readable storage medium of claim 15, wherein one or more other sensors that observe the environment in addition to the one or more sensors are installed at the vehicle, and wherein the program instructions cause the one or more computing devices to further implement:
- determining one or more protected locations in the environment external to the vehicle, wherein the one or more additional sensors observe the protected locations of the environment; and
- disabling sensor data capture for the one or more additional sensors.

19. The non-transitory, computer readable storage medium of claim 15, wherein the program instructions cause the one or more computing devices to further implement:
- evaluating the sensor data to identify one or more available parking locations in the environment; and
- sending an indication of the one or more available parking locations to a remote system.

20. The non-transitory, computer readable storage medium of claim 15, wherein the program instructions cause the one or more computing devices to further implement:
- receiving a request to disable automated stationary collision avoidance for the vehicle; and
- disabling evaluation of subsequent sensor data for possible collision events in response to the request to disable the automated stationary collision avoidance for the vehicle.

* * * * *